United States Patent Office 3,778,373
Patented Dec. 11, 1973

3,778,373
IRON CONTAINING FERROMAGNETIC CHROMIUM OXIDE

Harry Robbins, Los Angeles, Calif., assignor to Bell & Howell Company

No Drawing. Filed Nov. 8, 1971, Ser. No. 196,714
Int. Cl. C01g 37/02
U.S. Cl. 252—62.56 2 Claims

ABSTRACT OF THE DISCLOSURE

Ferromagnetic chromium oxide having an intrinsic coercive force above 600 oersteds is prepared by heating an intimate mixture of chromium (III) and iron (III) combined with oxygen with an oxidizing agent. In particular embodiments, the mixture is obtained by co-precipitation of the hydroxides from a solution of chromium (III) and iron (III) salts.

FIELD OF THE INVENTION

The field of art to which the invention pertains includes the field of magnetic compositions, particularly ferromagnetic chromium oxides.

BACKGROUND AND SUMMARY OF THE INVENTION

Ferromagnetic materials are employed in a variety of applications, some of which require a material having a high coercive force and others employing material having low coercive force. In response to these requirements, a variety of ferromagnetic materials have been formulated among which are several forms of ferromagnetic chromium oxide having a tetragonal crystal structure and which have been produced in high coercivity and low coercivity forms. The ferromagnetic species has been identified as chromium dioxide, but the broader term "ferromagnetic chromium oxide" is more suitable for many materials in which substitutional modifiers occupy spaces in the crystal lattice. U.S. Pat. No. 2,956,955 to Arthur, Jr., describes a ferromagnetic chromium oxide composition of tetragonal crystal structure which is produced by thermally decomposing chromium trioxide ($CrO_3$). The material has an intrinsic coercive force range of 35 to 100 oersteds but by incorporating various modifiers, chromium oxides having a coercivity range of from 26 to 542 oersteds have been produced; see for example the Ingraham and Swoboda Pats. 3,034,988, 3,068,176 and 2,923,683, Oppegard Pat. 2,885,365, Ingraham Pat. 2,923,684, Swoboda Pat. 2,923,685, Balthis, Jr. Pat. 3,449,073 and Kobota Pat. 3,243,260, disclosing the utilization of such modifiers as iron, titanium, vanadium, manganese, cobalt, nickel, fluoride, antimony, ruthenium, tin, alkali metal, alkali metal dichromate and tellurium. Other modifications are obtained by varying the process parameters. For example, Hicks Pat. 3,493,338 describes chromium oxide of zero intrinsic coercivity obtained by low pressure decomposition. Other decomposition processes are disclosed in Hicks Pat. 3,486,851, Hund Pat. 3,371,043, Arthur, Jr. and Ingraham Pat. 3,117,093 and Cox Pats. 3,074,778 and 3,078,147. In Cox et al. Pat. 3,451,771 conversion of chromium trioxide is conducted in the presence of chromium sesquioxide ($Cr_2O_3$) and oxygen. In addition to the foregoing, various oxidation processes have been disclosed yielding chromium oxide having intrinsic coercivities ranging from 30–445 oersteds such as described in Balthis, Jr. Pat. 3,423,320 and in Cox Pat. 3,278,263. In the Balthis, Jr. Pat. '320, chromium dioxide is formed by heating alkali metal chromium oxides containing a $Cr_3O_8$ group. In the Cox Pat. '263 chromium dioxide is prepared by heating a compound of chromium (III) combined with an oxidizing agent. High coercivities are particularly useful in anhisteretic processes for magnetic tape duplication, as known to the art.

In the present invention, ferromagnetic chromium oxide is provided having an intrinsic coercive force above 600 oersteds, a novel material not heretobefore available. The present materials are obtained by a process which in some espects is similar to the oxidation process of the aforementioned Cox Pat. 3,278,263, and the disclosure of that patent is incorporated herein by reference. However, the present process is critically different in other aspects. These differences give rise to the above mentioned novel properties. In particular, the general process conditions of the Cox Pat. '263, wherein a compound combined with oxygen is heated with an oxidizing agent, can be utilized in the present invention. However, in place of the simple chromium (III) compound combined with oxygen, one uses a mixture of chromium (III) and iron (III) combined with oxygen wherein the chromium and iron atoms are combined with oxygen in the same crystallite. Such mixture can be selected from oxides of chromium (III) and iron (III), hydrated forms of the oxides, hydroxides of the chromium (III) and iron (III), hydrated forms of the hydroxides, and mixtures thereof. The oxygen combined components form an intimately associated mixture and is preferably obtained by co-precipitation of the hydroxides from a solution of chromium (III) and iron (III) salts, followed by a heat treatment to convert to the oxide form.

DETAILED DESCRIPTION

As a first step in the present procedure, one obtains an intimately associated mixture of chromium (III) and iron (III) combined with oxygen. In a preferred method chromium (III) hydroxide and iron (III) hydroxide are co-precipitated from a solution of their salts and then heated to obtain a mixed oxide. Other processes which give rise to close intimacy of the components are not precluded, for example, oxidation of an alloy of chromium and iron metals or close grinding together of component oxide. When utilizing a co-precipitation process the hydroxides themselves may be directly oxidized to form the final iron-doped chromium dioxide product, or preferably, the hydroxides are first heated to form a mixture of oxides which is thereafter oxidized in accordance with the procedures contained in Cox Pat. 3,278,263, as further detailed below.

Initally, one dissolves in water, a water soluble salt of chromium (III), such as chromic nitrate, chromic chloride or chromic acetate, and a water-soluble salt of iron (III) such as ferric nitrate, ferric chloride, or ferric acetate. The relative percentages of the salts will be in substantial proportion, based on the weight of the cation, to the desired molar proportion of iron and chromium in the final ferromagnetic chromium oxide product and can range from about 0.05 to about 30.0 mole percent of iron (III) based on the chromium oxide-iron oxide starting material. The starting material has the formula $(Cr_xFe_{2-x})O_3$ wherein $x$ ranges from about 1.99 to 1.40. For example, chromic and ferric chloride hexahydrates ($CrCl_3 \cdot 6H_2O + FeCl_3 \cdot 6H_2O$) can be dissolved in the desired proportions in water to form a solution. Thereafter, ammonium hydroxide (e.g., 8–9% aqueous) can be added with strong agitation until a pH in the range of 7–9 is obtained whereupon chromium and iron hydroxides will have co-precipitated. The precipitate is allowed to settle and the supernatant liquid is syphoned off. The precipitate is washed several times by decantation with water, filtered and air dried.

Depending upon the subsequent method of oxidation, the precipitated hydroxides can be used as such or the hydroxides can be further heated to the oxide form and that form utilized for subsequent oxidation. In this regard, in the general form of the invention, any oxidant can be used which will cause the conversion of chromium (III) to chromium (IV), such as hydrogen peroxide, chromium trioxide or oxygen under pressure. In a preferred embodiment, the precipitate is heated to convert the hydroxide form to a chromium (III)-iron (III) oxide of the general formula $(Cr_xFe_{2-x})O_3$, referred to above.

Oxidation of the chromium (III)-iron (III) compound can be conducted as a single stage or as a double stage reaction. In the single stage reaction, the amount of oxidizing agent should be present in quantities sufficient to convert the chromium (III) component completely to ferromagnetic chromium dioxide, requiring at least one-half an atomic equivalent of oxygen for each atomic equivalent of chromium (III). Generally, the oxidizing agent will be employed in an amount of about 1.5–5 times the minimum requirement, but with gaseous oxygen or the like, much larger proportions of oxidizing agent can be employed.

Generally, about 1% to about 300% of water by weight of chromium (III) compound (or higher, but with no particular advantage) can be utilized. Depending upon the stages of treatment, the chromium (III) compound is converted to chromium dioxide by heating at a temperature above about 200° C. (generally about 600° C. is a practical upper limit) for from a few minutes to several hours, e.g., 24 hours, under pressures which range from substantially atmospheric (e.g., 0.5–5.0 atmospheres) to superatmospheric pressure, up to 3000 atmospheres or higher. For example, when heating directly from the precipitate, a pressure from about 50–3000 atmospheres or more can be utilized. In a two stage reaction, the precipitate is first heated or calcined at substantially atmospheric pressure, as above defined, to a temperature of about 200–1000° C. for a time ranging from a few minutes to a day or more. Heating is preferably carried out in the presence of air and can take place from a few minutes to a day or more. In a second stage, the resultant oxide is converted to ferromagnetic chromium oxide by oxidation at elevated pressure and temperature. Although optimum results are obtained under specific conditions chosen for the present starting materials, reference can be made to the Cox Pat. 3,278,263 for specific details of conversion temperatures in single stage and first and second stage reactions, which conditions are generally suitable.

It will thus be seen that as starting materials, one can utilize a mixture selected from oxides of chromium (III) and iron (III), hydrated forms of the oxides, hydroxides of chromium (III) and iron (III), hydrated forms of the hydroxides, and mixtures thereof. By using an intimately associated mixture, the ferromagnetic chromium oxide which is produced has properties which are markedly superior to the properties of the material obtained using only chromium combined with oxygen or casual mixtures of iron compounds with chromium components. In particular, ferromagnetic chromium oxide is obtained with the present invention having much higher coercivities than heretobefore obtainable. Whereas the highest coercivity reported by the Cox Pat. 3,278,263 is 445 oersteds, products of the present process have coercivities of 600 oersteds or higher, e.g., as high as 800 oersteds.

While it is not intended to rely on any particular theoretical considerations, it is believed that the close intimacy of the chromium (III) and iron (III) compounds, particularly when co-precipitated, may assure the co-existence of iron and chromium in the same lattice. As a result of the present procedure ferromagnetic chromium oxide is obtained in the form of fine, acicular particles of tetragonal crystal structure of the rutile type ranging up to 2 microns in length and having a median axial ratio of greater than 2:1, generally about 2:1 to about 20:1, containing about 54.5%–61.4% by weight of chromium and about 0.5%–8.0% of iron as integral parts of the crystal structure. Accordingly, a new composition of matter is provided, defined by the foregoing coercivity and crystal structure.

As salts for co-precipitation, one can utilize any water-soluble salt of chromium (III) and iron (III), such as the chromic chloride hexahydrate and ferric chloride hexahydrate above referred to. Other examples include chromic nitrate nonahydrate and ferric nitrate nonahydrate, chromic iodide and ferric iodide, chromic bromide and ferric bromide, chromic citrate and ferric citrate. Mixtures of each of the salts or both can be utilized.

If desired, supplemental modifying agents may be used in the processes of this invention. Examples of modifying agents are found in the patents above referred to and include such compounds as the oxides and sulfates of antimony, ruthenium, tellurium, and the like. Such modifiers serve to impart other desirable properties. The definition of intrinsic coercive force is given in Special Technical Publication No. 85 of the American Society for Testing Materials, entitled "Symposium on Magnetic Testing" (1948), pages 191–198.

The following examples, in which all parts are by weight, will illustrate the invention.

Example 1

A starting mixture of $Cr_2O_3$ hydrate and $Fe_2O_3$ hydrate can be prepared as follows. Two hundred and sixty seven parts of $Cr(NO_3)_3 \cdot 9H_2O$ and 133 parts of $$Fe(NO_3)_3 \cdot 9H_2O$$

are dissolved in 3000 parts of distilled water and stirred to dissolution. Sufficient ammonium hydroxide is added to completely precipitate all of the metallic salts as the hydroxide of chromium (III) and iron (III) in intimate association. The precipitate is washed, filtered and dried and then heated for about 1 hour at 500° C. to form a substance of the Formula $Cr_{1.4}Fe_{0.6}O_3$.

Fifteen parts of the prepared chromium-iron oxide, 50 parts of $CrO_3$ and 25 parts of distilled water are intimately mixed in a quartz test tube and the tube is placed in a pressure vessel. The pressure vessel is pressurized to 5000 p.s.i. with oxygen and is then heated to 335° C. for 4 hours, resulting in a ferromagnetic chromium oxide having a much higher coercivity than obtainable in the absence of the iron (III) component.

Example 2

The procedure of Example 1 was followed except that 1 part of antimony oxide was added to the mixture of chromium (III)-iron (III) oxide and chromium trioxide. The resultant ferromagnetic chromium oxide had a coercivity of 754 oersteds.

Examples 3–8

The procedure of Example 2 was followed except that the amount of the chromic and ferric nitrates and chromium trioxide oxidant were varied in accordance with the following table to yield ferromagnetic oxide having the properties listed.

| Example | Parts $CrO_3$ | Parts mixed oxide | Percent Fe in oxide | Hc, oersteds |
|---|---|---|---|---|
| 3 | 45 | 18 | 20 | 680 |
| 4 | 50 | 15 | 20 | 747 |
| 5 | 40 | 20 | 20 | 760 |
| 6 | 38 | 22 | 20 | 775 |
| 7 [1] | 35 | 25 | 20 | 690 |
| 8 [2] | 35 | 25 | 20 | 680 |

[1] 0.5% $Sb_2O_3$. [2] 2.5% $Sb_2O_3$.

Example 9

Eighty parts of $Cr(NO_3)_3$ and 20 parts of $Fe(NO_3)_3$ were ground together to form an intimate mixture and heated in air to 350° C. to form a paste and then a solid having the formula $Cr_{1.6}Fe_{1.4}O_3$. Thirty five parts of $CrO_3$, 25 parts of the solid, 1 part of $Sb_2O_3$ and 25 parts of distilled water were heated for 4 hours at 330° C. to form a ferromagnetic chromium oxide having a coercivity of 762 oersteds.

Example 10

The procedure of Example 1 was followed except that 35 parts of $CrO_3$ was added to a mixture of 25 parts of chromium (III)-iron (III) oxides having the formula $Cr_{1.6}Fe_{0.4}O_3$ together with 5 parts of $NH_4NO_3$, 1 part of $Sb_2O_3$ and 20 parts of distilled water. The vessel was pressurized to 6000 p.s.i. with oxygen and heated for 3.5 hours at 330° C. to yield a ferromagnetic chromium oxide having a coercivity of 778 oersteds.

I claim:

1. Ferromagnetic chromium oxide in the form of fine accicular particles ranging up to two microns in length and having a median axial ratio of greater than 2:1, said particles containing 54.5%–61.4% by weight of chromium and 0.5%–8.0% by weight of iron, as an integral part of their crystal structure, and having an intrinsic coercive force above 600 oersteds.

2. Ferromagnetic chromium oxide in the form of fine accicular particles ranging up to two microns in length and having a median axial ratio of greater than 2:1, said particles consisting of 54.5%–61.4% by weight of chromium and 0.5%–8.0% by weight of iron as integral parts of their crystal structure, and the balance being oxygen, said particles having an intrinsic coercive force about 600 oersteds.

References Cited

UNITED STATES PATENTS

| | | | |
|---|---|---|---|
| 3,278,263 | 10/1966 | Cox | 252—62.51 X |
| 3,640,871 | 2/1972 | Kawamata et al. | 252—62.51 |
| 3,034,988 | 5/1962 | Ingraham et al. | 252—62.51 |
| 3,451,771 | 6/1969 | Cox et al. | 252—62.51 X |

OSCAR R. VERTIZ, Primary Examiner

J. COOPER, Assistant Examiner

U.S. Cl. X.R.

252—62.51; 423—607

UNITED STATES PATENT OFFICE
CERTIFICATE OF CORRECTION

Patent No. 3,778,373 Dated December 11, 1973

Inventor(s) Harry Robbins

It is certified that error appears in the above-identified patent and that said Letters Patent are hereby corrected as shown below:

Column 6, line 6, change "about" to "above".

Signed and sealed this 30th day of July 1974.

(SEAL)
Attest:

McCOY M. GIBSON, JR.
Attesting Officer

C. MARSHALL DANN
Commissioner of Patents